United States Patent [19]

Rabinow

[11] 4,194,126
[45] Mar. 18, 1980

[54] ESCORT MEMORY USING MIRRORS

[75] Inventor: Jacob Rabinow, Bethesda, Md.

[73] Assignee: Hall & Myers, Potomac, Md.; a part interest

[21] Appl. No.: 884,349

[22] Filed: Mar. 6, 1978

[51] Int. Cl.² .............................................. G06K 7/10
[52] U.S. Cl. ................................ 250/566; 250/223 R; 235/454
[58] Field of Search ........... 250/555, 566, 568, 223 R; 235/467, 454

[56] References Cited

U.S. PATENT DOCUMENTS

| | | | |
|---|---|---|---|
| 2,901,089 | 8/1959 | Rabinow et al. | 198/352 |
| 3,080,985 | 3/1963 | Rabinow et al. | 250/383 |
| 3,180,996 | 4/1965 | De Good et al. | 250/223 R |
| 3,227,886 | 1/1966 | Dunigan et al. | 250/223 R |
| 3,324,283 | 6/1967 | Chu | 235/454 |
| 3,538,338 | 11/1970 | Rabinow | 250/223 R |
| 3,643,065 | 2/1972 | Dunigan | 235/454 |
| 4,022,340 | 5/1977 | D'Aloia | 214/307 |

*Primary Examiner*—David C. Nelms
*Attorney, Agent, or Firm*—William D. Hall

[57] ABSTRACT

This invention describes a sorting conveyor code system using a plurality of mirrors to set up each individual code. Each mirror has two positions so that it can reflect light into one of two directions if the light comes from a common source, one position being called a "0" and the other position being called a "1." A set of such mirrors then can carry a binary number with the number of digits equal to the number of mirrors. Each article to be sorted is accompanied by a set of such mirrors and the recognition circuitry consists of a light source and a set of optical detectors to detect the absence or presence of light in a particular direction.

9 Claims, 10 Drawing Figures

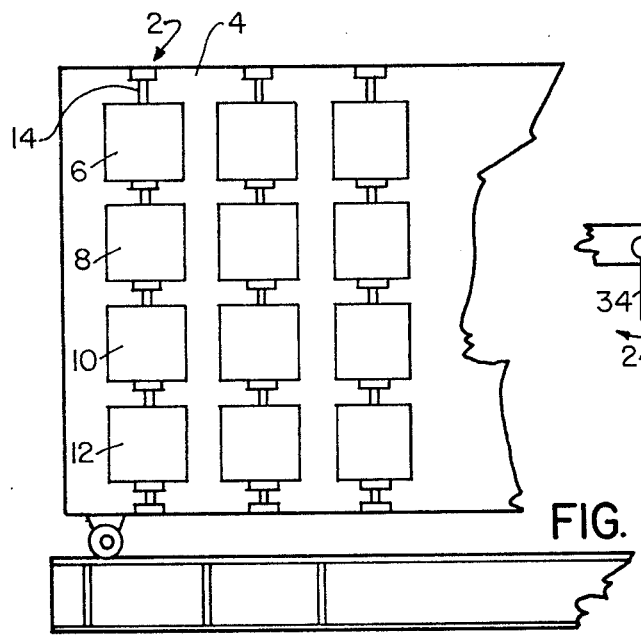
FIG. 1
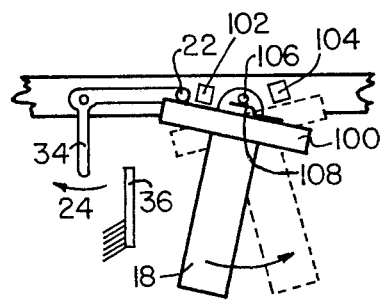
FIG. 3
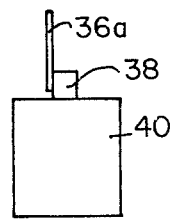
FIG. 5
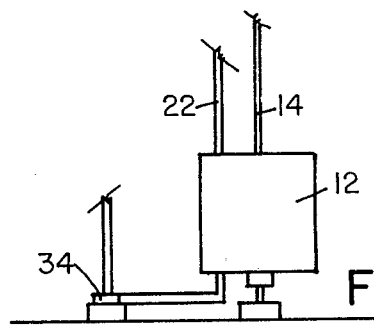
FIG. 4
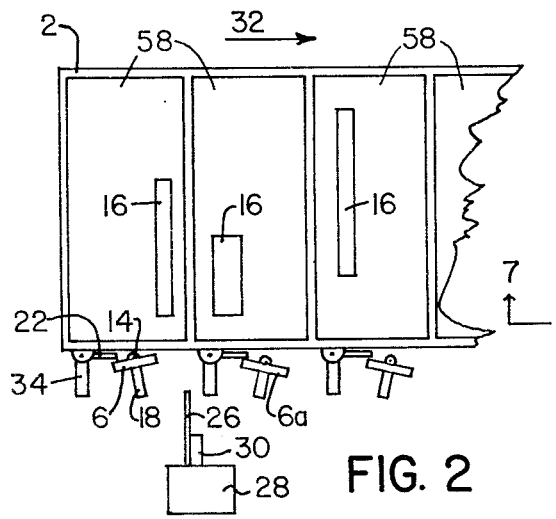
FIG. 2
FIG. 6

ESCORT MEMORY USING MIRRORS

BACKGROUND OF INVENTION

Reference is made to sorting systems particularly such as used for letter mail described, for example, in U.S. Pat. No. 2,901,089 issued to Lawrence J. Kamm and Jacob Rabinow dated Aug. 25, 1959. See also U.S. Pat. No. 3,538,338, issued to me on Nov. 3, 1970, which shows another type of optical escort memory. Reference is also made to U.S. Pat. No. 3,080,985, which shows a method for setting the code wheels of the above-mentioned U.S. Pat. No. 2,901,089. An additional patent of interest may be U.S. Pat. No. 4,022,340, issued to Andrew E'Aloia on May 10, 1977, which shows a modification of the letter carrier system first disclosed in my U.S. Pat. No. 2,901,089.

Escort memories may be of many types — mechanical memories, such as shown in the referenced patents referred to above; optical memory, such as shown in U.S. Pat. No. 3,538,338, mentioned above; magnetic recordings either carried by the conveyor belt or by members attached thereto; and so on.

SUMMARY OF THE INVENTION

The present invention is one which has the advantage that it consists of simple and inexpensive elements such as glass, plastic or metal mirrors, a set of which accompanies each item to be sorted. The mirrors can be set into either of two angular positions so as to reflect a given source of light in either of two directions. A set of photocells is used as the receptacles for the light so as to detect the position of the mirrors. The outputs of the photocells include circuitry to trip a solenoid or any other releasing device which releases the article into the proper receptacle when the correct code is recognized.

The code is of the binary type so that each mirror needs only to have two positions; one for 0 and the other for 1. It is possible to use more than two positions for each mirror, resulting in a higher order numeric system but I prefer, for simplicity and reliability, to limit each mirror to only two positions.

BRIEF DESCRIPTION OF THE DRAWINGS

FIG. 1 shows a side view of a section of a conveyor cart, a set of mirrors forming the escort memory and a set of stationary receptacles.

FIG. 2 shows the top view of the mechanism of FIG. 1.

FIG. 3 shows a detail of the mirror setting and resetting mechanism.

FIG. 4 shows a detail of the resetting mechanism.

FIG. 5 shows a detail of the setting or resetting solenoid.

FIG. 6 shows the top view of the code recognition device.

DETAILED DESCRIPTION OF THE INVENTION

Figure 9:
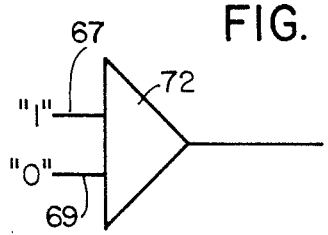
FIG. 9 shows the schematic diagram of a single bit recognition circuitry.

FIG. 1 is a side view of a cart 2, such as described in some of the patents listed above, on the side panel 4 of which I show four mirrors 6, 8, 10 and 12 mounted for rotation on the vertical shaft 14. It should be understood that four mirrors would not be the usual number since four mirrors in the binary system enables one to sort to only 16 receptacles, and in practical machines a much larger number of mirrors would be used. For example, ten mirrors would enable me to sort to over 1,000 destinations and twelve mirrors to over 4,000 destinations. In practice, therefore, depending on the number of sorts used, the number of mirrors would be increased accordingly. Since the mirrors could be approximately half an inch in height, there would be no difficulty in arranging a vertical column of twelve such mirrors on a side panel seven or eight inches high.

FIG. 2 shows a top view of a section of the cart 2 with three sets of mirrors, showing only the top one of the mirrors next to each bin 58, with each bin carrying an object 16 to be sorted. It should be understood that the other mirrors of each set are not shown for the sake of clarity. Each set of mirrors is mounted on a fixed shaft 14 and each mirror is provided with an extension arm 18, which can be seen in FIGS. 1, 2 and 3, by means of which the mirrors can be set to the desired position.

Figure 10:
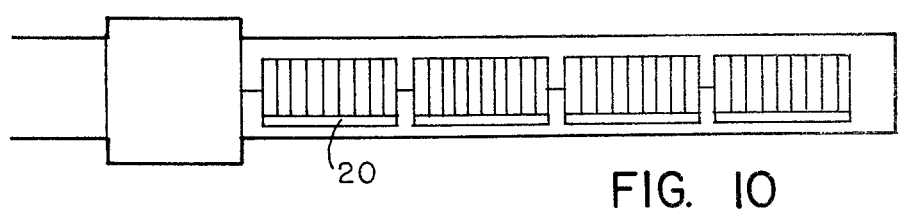
FIG. 10 shows a top view of the general arrangement of a letter sorting conveyor.

When the conveyor 20 (see FIG. 10) finishes its circuit of sortation and all of the objects 16 have been sorted, all of the mirrors have to be reset to the 0 position, such as shown by the dotted line in FIG. 3 and the mirror 6 in FIG. 2. This is done by a separate rotating bale 22 shown in FIGS. 3 and 2, which when swung clockwise (see arrow 24 in FIG. 3) resets all the mirrors of that one column. The bale 22 is shown in its rest position in FIGS. 2 and 3.

All of the operations of setting and resetting of the mirrors are accomplished by the motion of the conveyor itself and interposers 26 operated by electromagnets 28 (FIG. 2). However, other means, could be employed to set the mirrors. One such electromagnet 28 is shown in FIG. 2, so that when the armature 30 of the electromagnet 28 is extended into the position shown, a spring 26 will interfere with the motion of the lever 18 and swing the mirror 6 clockwise into the position shown at 6a. It should be understood that the set of solenoids 28, one above the other, shown in FIG. 2 is necessary only at the position where the objects 16 are inserted into the conveyor 20 and where, therefore, the mirror escort memory has to be set.

I provide the flat leaf spring 26 on the solenoid 30 so that after setting the mirror 6 it can be pushed aside by the further motion of the mirror 6 as the cart 2 moves to the right as shown by the arrow 32 in FIG. 2.

When the operator places an object 16, to be sorted, into one of the bins, he enters a coded address into conventional apparatus for such purpose, which apparatus includes means for operating the required solenoids 28 for setting the mirrors 6, complementary to that bin, to the desired positions to thus indicate the destination of the object 16. Since designing suitable means for entering a coded address and operating the correct solenoids by that address involves no more than elementary electrical skill, I have not illustrated the apparatus for achieving that function.

If it is necessary to reset all the mirrors at the end of travel, as I said before, the resetting bale 22 (FIG. 3) is swung by its projecting lever 34, which is below or above all the mirrors, and which is acted on by a separate fixed spring 36 shown in FIG. 3. This spring 36 is necessary in only one position in the whole conveyor, that is, at the place where all the mirrors have to be reset. In FIG. 4, I show a side view of the bale 22 and the bottom mirror 12 of the set of four mirrors of FIG. 1.

If it is desired to reset the mirrors at some intermediate position of the conveyor, a similar trip 36A can, of course, be provided at that point and it can be made optional by being connected to the armature 38 of the solenoid 40 which can be used to reset some sets of mirrors individually, see FIG. 5.

Figure 7:
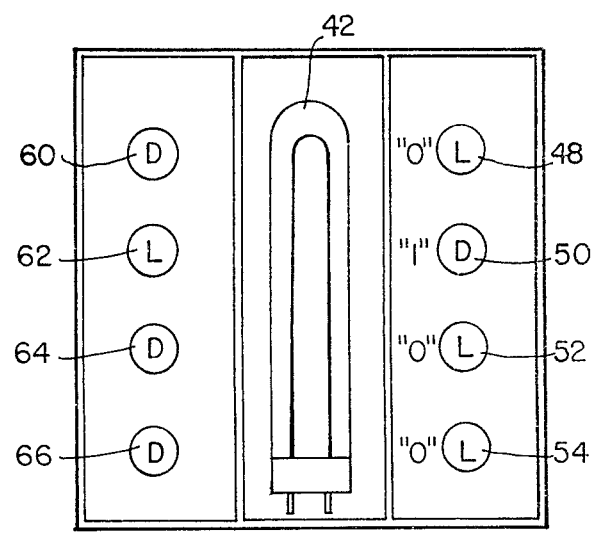
FIG. 7 shows the side view of the device of FIG. 6.

In order to recognize a particular code, I show an arrangement of a light and photocells in FIGS. 6 and 7. A vertical filament lamp 42 or plurality of small lamps can be used to illuminate each set of mirrors 44 as they pass by. In FIG. 6, I show light from lamp 42 impinging on the top mirror 46. This mirror is in the position "0"; that is, the mirror 46 has not been swung clockwise and it deflects the light onto photocell 48.

FIG. 7 shows the side view taken along line 7—7 of FIG. 6. With four mirrors I need four photocells, one above each other as shown in FIG. 7, at 48, 50, 52 and 54. I show light baffles 56 in FIG. 6 to control the light so that the light from the lamp 42 is collimated to impinge only on the mirrors of column containing mirror 46, mounted on the particular carrier box number or bin 58 (FIG. 6). The light coming to the photocell is also baffled by plates 56 so the photocells cannot see light from any other set of mirrors except the mirrors of the particular set illuminated by lamp 42.

Only four photocells are needed to detect the code of my example in FIG. 7. If the top photocell 48 is set to recognize a "0" the second photocell 50 is set to recognize a "1"; the next two, 52 and 54, are set for "0's", as shown in FIG. 7 (with L meaning seeing light, "D" meaning dark), we have 0, 1, 0, 0 or L, D, L, L. This would be enough to recognize this particular code in a unique way, but I can also provide another set of photocells 60, 62, 64 and 66 to the left of the light 42 as shown in FIG. 7. These photocells 60 to 66 would receive light only from the mirrors of the set under mirror 46 which have been swung clockwise or those which read digits "1". These photocells would be reading D, L, D, D, because the top mirror 46, which is seen in FIG. 6, does not reflect light to photocell 60, the next mirror is swung to the left, and the next two to the right again. The use of these extra photocells 60, 62, 64, and 66 is not absolutely necessary for the operation of my device but they provide a check on the right-hand set of photocells. Other forms of code checks can be used, such as even or odd parity, by the addition of an additional mirror.

Figure 8:
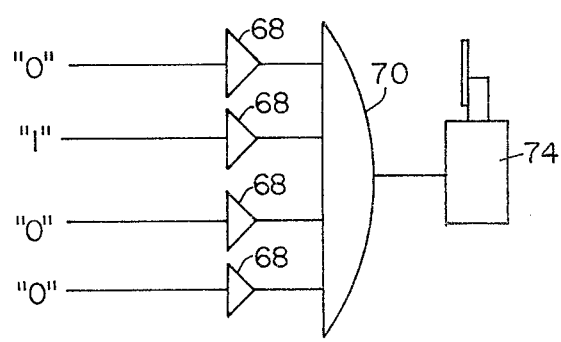
FIG. 8 shows a simplified schematic of the electrical portion of the recognition device.

It should be understood that each photocell can be fed into an amplifier 68 (FIG. 8). The outputs of the amplifiers 68 are fed into a suitable gate 70 so that for a particular combination such as 0, 1, 0, 0 in FIG. 8, an output will be produced only when that particular combination is sensed.

If two photocells are used for each mirror; that is, if they can be fed into the two differential inputs 67 and 69 of the amplifier 72 shown in FIG. 9, one must be dark with the other light to produce the output of amplifier 72. This gives additional safety which may be desirable in some cases.

The output of the electronic circuit of FIG. 8 can be fed to a electromagnet 74 which interposes the trip of the bottom door of the item-carrying compartment, or bin 58. Such a trip is shown, for example, in FIG. 5 of U.S. Pat. No. 3,538,338. Other mechanisms of tripping the door of a cart can, of course, be used and the trip mechanism is not important to the main idea of my patent which has to do with the coding system.

The great virtue of the design of this specification is that the recognition circuitry (light 42 and the photocells 48 to 54 and 60 to 66) can be placed at a distance from the cart 2 so that irregularities in the motion of a conveyor cart 2, such as due to dirt on the tracks, do not cause the escort memory element to contact or affect the recognition circuitry. The recognition devices can be placed several inches away from the side of the cart and be completely physically protected by the light-baffle plates 56 which are in front of the light and the photocells. For the same reason, the mirrors are also protected from improper contacts because they do not contact any object on their way from the coding station to the destinations where the objects 16 are dropped out of the conveyor. The only time that anything touches the mirror assembly is at the point where insertions of the object are made and where the codes are set. This position can be carefully monitored and carefully designed so that the tracks at this point can be carefully checked and the mirror setting solenoids can be mounted on compliant mounts so that if for any reason the mirror assembly is damaged and the mirrors and their levers are not in their correct positions, the solenoids and their projecting springs will not further damage the components but simply be pushed out of the way.

The optical code of this invention has another great virtue in that the mirrors, being vertical, do not tend to collect dust, can be easily cleaned along the passage of the conveyor by a blast of air, and, finally, once in a long while they can be washed by a spray which can be directed against the side of the cart if the mirrors should become very dirty.

It should also be understood that the amplifiers following the photocells do not need to have completely constant D.C. gain since they can be AC coupled to the photocells. They will then be driven from "dark" to "light" as the conveyor moves. This has the advantage that DC drifts of the photocells and amplifiers need not affect the output. The change of light intensity between the mirror that is pointed the wrong way, that is, away from the photocell, and one that is pointed toward the photocell can be very large and the ratio of the outputs can be equally large so that simple circuits can be employed. It should also be understood that automatic amplifier gain controls can be used with very long time constants. Thus, as the carts pass by and the mirrors direct light into and out of the photocells, the gain of the amplifiers can be automatically adjusted to take care of long-term variations of sensitivity of the photocells, the intensity of the light source, and the gain of the amplifiers themselves. These techniques are well known in the electronic art and need not be described here.

While I normally speak of mirrors being made of glass mounted on suitable metal structures, the mirrors can be made of metal or of suitable plastics. There are highly reflective materials such as special aluminum surfaces, other polished metals, and coated plastics that can serve perfectly well in this capacity. The choice of the material would be up to the designer and would depend on cost of fabrication, permanence and the usual engineering considerations.

While I show the mirrors and the shafts on which they are mounted as being attached directly to the side panel of the sorting conveyor cart 2, this construction is not necessarily the preferred one. The designer may prefer to mount the mirrors, their shafts, and resetting bales on a separate plate attached at suitable points to the side of the conveyor. The advantage of doing this is that variations in the height of the conveyor carts due to wear of its wheels, or variations in dimensions due to production tolerances, can be easily compensated by adjusting this plate to a pre-set position after the conveyor has been assembled. Because the mirrors can be approximately a half-inch in height and width when used for a usual mailsorting conveyor, the tolerances in position are quite broad and this adjustment should not be necessary, but if one should desire to use a much larger number of mirrors and to use much smaller mirrors, then such individual adjustment of the whole assembly may be desirable.

It should be further understood that the positions of each mirror; that is, each of its two positions, should be rather carefully controlled because the reflection of the light into the appropriate photocell requires that the angle of the position of the mirror be correct. If only one set of photocells is used as mentioned earlier, then the "1" position of the mirror is not important since the "0" position is the only one that can be seen. However, if both sets of photocells are used and the light has to be seen as reflected by the mirror in either the "0" or the "1" position, then both positions should be carefully controlled. Please refer again to FIG. 3. The control of the mirror 100 can be accomplished by having stops 102 and 104 behind the mirror, against which the mirror 100 is pressed either by the bale 22 that resets it, or by the setting lever 18 when it is set.

I want to emphasize that my drawings are quite schematic and that exact details of construction are easily within the state of the art for such machinery. To keep the mirrors in position after they are set or reset, I can provide friction between mirrors and the vertical shafts 106 on which the mirrors are mounted by using small leaf springs 108 behind each mirror. If the glass or plastic mirror is mounted on a steel member, I can use small magnets for stops 102 and 104 as shown in FIG. 3 to hold the mirror in either position after it is moved. These magnets 102 and 104 could be quite weak and simply keep the mirror from vibrating out of its correct position after being set or reset. Again, techniques of holding a member in one of two positions require no special engineering since once a mirror is set into its desired position at the beginning of its travel, it is no longer contacted by any physical matter except air and it should not require much holding force to stay in position. I found in my experimental work that friction means are more than adequate to do this but, as I said, if a great deal of vibration is present or more positive control than friction is desired, then the magnets could be used and other latching devices are, of course, available.

While I show one array of mirrors as the code-bearing assembly for one object to be sorted, two (or more) columns of mirrors can be used for a single code. In such a system, the light source would be arranged to illuminate the two (or more) columns of mirrors simultaneously, and the photocells would be suitably arranged to receive the light from the array or mosaic of mirrors. To prevent false triggering of the recognition circuitry in such systems, one mirror can be mounted above or below the mosaic so as to act as a synchronizing trigger for the whole set.

If space permits, the mirrors can be mounted in a horizontal row (parallel to the motion of the conveyor) and the code detected by only one photocell "seeing" the mirrors in sequence. In such an arrangement, the electronic circuitry would sense the sequence of digits and produce a trip signal when the sequence is correct for that particular destination. The recognition of a number consisting of a sequence of binary digits is well known to the present art of electronics.

I claim to have invented:

1. In a machine for sorting articles by selectively delivering them to a multiplicity of destinations, a conveyor including a series of article storage devices for respectively receiving articles to be sorted, a source of light, light beam reflecting means responsive to said source and associated with each article storage device for producing light beams which represent a coded address for the destination of the article associated with its complementary article storage device, and means, for each of a multiplicity of destinations, responsive to light beams from said light beam reflecting means for determining when a given article storage device has reached its proper destination as determined by said coded address;

said light beam reflecting means associated with each article storage device having mirrors each independently selectively settable to one of only two positions to reflect the light to form beams that collectively represent the address in the binary code.

2. In a machine for sorting articles as defined in claim 1 in which:

each said mirror is mounted for rotation into either one of two angular positions, and in which:

said light reflecting means including means whereby each mirror is in first or second ones of two angular positions so that the beams of light from the mirrors will collectively represent the coded address of the destination of the article associated with the article storage device with which the mirrors are associated.

3. In a machine for sorting articles as defined in claims 1 or 2 in which each said means, for each of a multiplicity of destinations, responsive to said light beam reflecting means comprises:

first and second light detectors, for each mirror, respectively responsive to beams from the mirror in its first and second angular positions, and means for indicating the first angular position of the mirror only when said first detector, but not the second, responds to light and indicating the second angular position of the mirror only when said second detector, but not said first, responds to light.

4. In a machine for sorting articles as defined in claims 1 or 2 including means setting the mirrors to one of their two positions when they pass a given location, and means for thereafter setting at least some of said mirrors to the other of said two positions to provide the coded address.

5. In a machine for sorting articles, a multiplicity of destinations, a plurality of movable devices for carrying the articles to be sorted past said multiplicity of destinations, light producing means, a plurality of mirrors associated with each of said devices, each mirror being responsive to said light producing means and settable in first or second ones of two positions so that the aggregate of all of the mirrors on a given device produce light beams that represent a coded address of one of said destinations, and a plurality of detectors respectively associated with a plurality of said destinations for detecting when light beams from the mirrors associated with any one of said devices represent the address of its complementary destination, comprising: means, for each mirror of a given device, for indicating that the light beam from that mirror represents a digit of the address of the destination when and only when the light beam from that mirror is in a direction representing said mirror in one of said two positions accompanied by the absence of a light beam such as would be expected if the mirror was in the other of said two positions.

6. In a machine for sorting articles as defined in claim 5:

said last-named means comprising two light detecting devices one of which will receive a light beam from the mirror when the mirror is in the first of said two positions and the other of which will receive a light beam from the mirror when the mirror is in the second of said two positions, and signal producing means responsive to said light detecting devices for giving a first signal only if the first but not the second of said light detecting devices detects a light beam.

7. In a machine for sorting articles as defined in claim 6:

said signal producing means giving a second signal only if the second but not the first of said light detecting devices detects a light beam.

8. In a machine for sorting articles, a multiplicity of destinations, a plurality of movable devices for carrying the articles to be sorted along a path past said multiplicity of destinations, a source of light, a plurality of mirrors associated with each of said devices, each mirror being responsive to said source and settable in first and second ones of two positions so that the aggregate of all of the mirrors on a given device produce light beams that represent a coded address of one of said destinations, control means for setting at least some of said mirrors to produce a setting of the mirrors which in the binary code represents an address for the destination of the article, and means responsive to the light reflected by said mirrors for determining the destination of the article associated with said given device.

9. In a machine for sorting articles as defined in claim 8, means for setting each of the mirrors associated with a given device to one of said two positions at a first place along said path, said control means setting at least some of said mirrors to the other of said two positions subsequent to said first setting to thus produce said address for the article.

* * * * *